US008199608B2

(12) United States Patent
Piel et al.

(10) Patent No.: US 8,199,608 B2
(45) Date of Patent: Jun. 12, 2012

(54) SYSTEM AND METHOD FOR ADJUSTING SENSITIVITY OF AN ACOUSTIC SENSOR

(75) Inventors: Kevin G. Piel, Ronkonkoma, NY (US); Christopher D. Martin, Plainview, NY (US); Richard A. Smith, El Dorado Hills, CA (US); Tom R. Petek, Sacramento, CA (US)

(73) Assignee: Honeywell International Inc., Morristown, NJ (US)

( * ) Notice: Subject to any disclaimer, the term of this patent is extended or adjusted under 35 U.S.C. 154(b) by 531 days.

(21) Appl. No.: 11/761,719

(22) Filed: Jun. 12, 2007

(65) Prior Publication Data

US 2008/0310254 A1 Dec. 18, 2008

(51) Int. Cl.
*H04B 17/00* (2006.01)

(52) U.S. Cl. .......................................... 367/13; 73/1.82

(58) Field of Classification Search .................... 367/13; 73/1.82

See application file for complete search history.

(56) References Cited

U.S. PATENT DOCUMENTS

| | | | | |
|---|---|---|---|---|
| 5,341,122 A | | 8/1994 | Rickman | |
| 5,524,099 A | | 6/1996 | Rickman et al. | |
| 6,028,505 A | * | 2/2000 | Drori | 340/426.17 |
| 7,277,012 B2 | * | 10/2007 | Johnston et al. | 340/545.4 |
| 2005/0128067 A1 | * | 6/2005 | Zakrewski | 340/511 |
| 2006/0125621 A1 | | 6/2006 | Babich | |
| 2006/0238337 A1 | * | 10/2006 | Minassian et al. | 340/539.23 |

FOREIGN PATENT DOCUMENTS

| | | |
|---|---|---|
| EP | 1 158 840 | 11/2001 |
| GB | 1167142 | 10/1969 |
| WO | WO 96/25021 | 8/1996 |
| WO | WO 2006/073483 | 7/2006 |

OTHER PUBLICATIONS

European Search Report EP 08 15 8111 dated Jul. 8, 2009 (8 pages) for companion EP case.

* cited by examiner

*Primary Examiner* — Ian Lobo

(74) *Attorney, Agent, or Firm* — Husch Blackwell

(57) ABSTRACT

A method of adjusting a sensitivity of an acoustic detector. The acoustic detector receives a signal from a remote device. The signal embodies an operating instruction for the acoustic detector. The signal is decoded into an operating instruction for the acoustic detector. The sensitivity of the acoustic detector is adjusted according to the operating instruction. The acoustic detector can increase or decrease the sensitivity. After the sensitivity is adjusted, the acoustic detector sends a confirmation of the adjustment to the user.

10 Claims, 5 Drawing Sheets

SYSTEM AND METHOD FOR ADJUSTING SENSITIVITY OF AN ACOUSTIC SENSOR

FIELD OF THE INVENTION

The invention relates to security systems, communication systems and acoustic detectors. More particularly, the invention relates to a method and system for remotely adjusting the sensitivity of an acoustic sensor using a remote control device.

BACKGROUND

Acoustic detectors are commonly used to detect and indicate attempts to break into premises. The most common acoustic detector is a glass breakage detector. The detector generates an alarm signal when the sound of a breaking window is detected. Typically, the detectors are remotely mounted from the protected glass and are attached to a ceiling or a wall. The location of the detector is dependent on the size of the protected area and a number of other mounting restrictions that are manufacturer specific.

The detectors rely on detecting the sound of breaking glass by sensing one or more known frequency components associated with the sound of breaking glass. When the glass break detector is installed, it is typically tested to ensure proper functionality. Additionally, it is tested to customize the detector for a given location, such that acoustic properties of the proximate environment are compensated for by a sensitivity adjustment to optimize the sensing range of the detector. Various common objects found in an indoor location can affect the performance of the detector, such as carpet, ceiling tiles, walls or floors, due to the reflection and absorption of frequency components.

To test the detectors, a glass break simulator is used to simulate the glass breakage. For example, U.S. Pat. No. 5,341,122 describes a glass break simulator capable of generating different frequency components indicative of broken glass. However, to adjust the level of sensitivity of the detector, an installer needs to open the detector each time the level must be changed. In practice, the sensitivity adjustment can occur several times, requiring the installer to manually adjust the sensitivity each time by changing a switch setting inside the detector. Since each installation is different, the installer would have to climb a ladder and open the detector several times before achieving the proper sensitivity level. This adjustment process is time consuming and cumbersome. Because the process is cumbersome, installers will often not optimize the range for the given site, leading to a less than ideal installation.

Accordingly, there is a need to be able to test the detector and adjust the sensitivity of the detector without having to open the detector and change the switch setting.

SUMMARY OF THE INVENTION

Disclosed is a method for remotely adjusting the sensitivity level of an acoustic detector using a remote control device by transmitting a wireless signal to the acoustic detector, thereby instructing the detector to increase or decrease its sensitivity.

The method of adjusting the sensitivity of an acoustic detector comprises receiving a signal from a remote device, decoding the signal into the operating instruction for the acoustic detector, and adjusting the sensitivity of the acoustic detector according to the operating instruction. The signal embodies an operating instruction for the acoustic detector.

In one illustrative embodiment, the sensitivity level of the detector can be adjusted by changing a detection threshold. The detection threshold is used for alerting the controller or decoder of an acoustic event. The detection thresholds are programmed in a controller memory.

The signal can be any type of wireless signal such as an acoustic signal, RF signal or an infrared signal. In one illustrative embodiment, the signal includes a plurality of pulses separated by spaces in time.

The acoustic detector decodes the signal by detecting a leading edge of each pulse of the signal, outputting a detection signal indicating the detection of the pulses, determining timings between the detection of each pulse, comparing the timings of the detection with predefined timings, and outputting the instruction based upon the comparison.

The signal can also instruct the detector to indicate its current sensitivity level.

The method further includes a step of confirming the adjustment of the sensitivity. The confirmation indicates the new sensitivity level. The indication can be an audible indication or a visual indication.

Also disclosed is an acoustic detector for detecting glass breakage. The detector comprises a receiving section for receiving a signal from a wireless remote control device, a decoder for decoding the signal into a control signal, and a controller for changing the sensitivity level of a sensor based upon the control signal.

The decoder comprises a storage device for storing a plurality of preset patterns and corresponding instructions, a comparator for matching the decoded pattern to one of said plurality of preset patterns, and an output device for outputting one of the predefined instructions, which corresponds to a matched pattern. Each preset pattern is associated with a predefined instruction. One preset pattern corresponds to an instruction to decrease the sensitivity of the sensing element and a second preset pattern corresponds to increase the sensitivity of the sensing element. Another preset pattern corresponds to a signal instructing the acoustic detector to confirm the setting.

The detector also includes a notification device for indicating a current sensitivity setting of a sensing element. The notification device can include a light source such as an LED. A specific pattern of light indicates the current sensitivity setting.

Also disclosed is a system for controlling the sensitivity of an acoustic detector comprising a remote control device and an acoustic detector. The system comprises a remote control device that generates and transmits a signal to the acoustic detector. The signal embodies an operating instruction for the acoustic detector. The signal comprising a plurality of pulses separated by predefined spaces in time. The acoustic detector comprises a receiving section for receiving the signal, a decoder for decoding the signal into an operating instruction, and a controller for adjusting the sensitivity of a sensor according to the operating instruction. A remote control device can be an acoustic simulator. The remote control device can also be a security system keypad.

BRIEF DESCRIPTION OF THE DRAWINGS

These and other features, benefits and advantages of the present invention will become apparent by reference to the following text figures, with like reference numbers referring to like structures across the views, wherein.

DETAILED DESCRIPTION OF THE INVENTION

Figure 1:
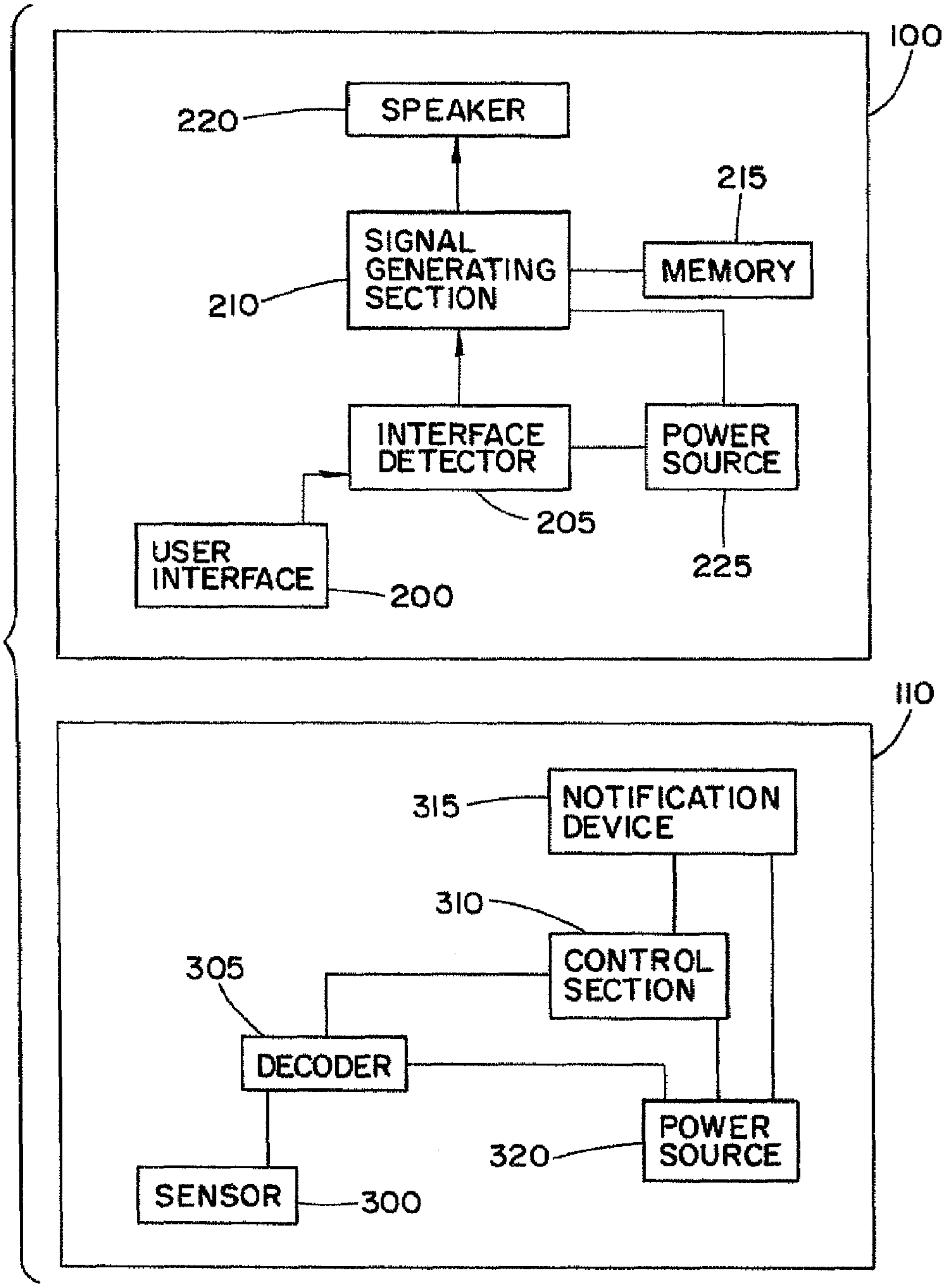
FIG. 1 illustrates a basic diagram of the remote control system of the invention including a block diagram of a remote control device and a block diagram of an acoustic detector according to an embodiment of the invention.

FIG. 1 illustrates the remote control system in which a remote control device 100 is used to adjust the sensitivity of an acoustic detector 110. The remote control device 100 can be any device capable of transmitting a calibrated acoustic signal. In one embodiment, the remote control device 100 is a glass break simulator. For example, the remote control device 100 can be the glass break simulator as described in U.S. Pat. No. 5,341,122 issued to Stephen Rickman, which is hereby incorporated by reference.

The remote control device 100 may be configured to generate a control signal to control specific features of an acoustic detection.

The remote control device 100 includes a user interface section 200 adapted to allow a user to input a control instruction. The user interface section 200 can be a DIP switch, a jog dial, or an arrow key or button. Alternatively, the user interface section 200 can be an alphanumeric keypad. The remote control device 100 also includes an interface decoder 205. The interface decoder 205 is coupled to the user interface section 200 to detect and decode the user input from the user interface section (200). For example, if the alphanumeric keypad is used as the user interface section 200, the interface decoder 205 determines which key is pressed. This determination will use a known method for detecting a key depression. The determination process will not be described herein. The interface decoder 205 can use the same process for arrow keys.

Alternatively, if a jog dial is used, the interface decoder 205 determines a direction of revolution and magnitude based upon a relative voltage. The detection of the rotation of a jog dial is also known and will not be described.

Alternatively, if a switch is used as the user interface section, the interface decoder 205 will detect the opening or closing of the switch or relays.

The remote control device includes an acoustic signal generating section 210 and memory 215. The acoustic signal generator section 210 generates a predefined acoustic signal based upon the user input detected by the interface decoder 205. The predefined acoustic signal is retrieved from memory 215. The memory 215 includes a database or lookup table of a plurality of predefined acoustic signals. In a preferred embodiment, different acoustic signals will have different patterns defined by different space or timing between elements. Each pattern corresponds to a different control instruction or function. For example, the encoded acoustic signal can be the acoustic signal described by U.S. Pat. No. 5,524,099, issued to Stephen Rickman, which is hereby incorporated by reference.

The encoded acoustic signal is a series of spaced-apart pulses encoded by a relative inter pulsed timing of the spaced apart pulses. The acoustic signal generating section 210 encodes the signal with the relative timing; the encoding instructions and pulses are stored in memory entered by control function. For example, the memory section 215 contains set timings and pulses for increasing or decreasing the sensitivity of an acoustic detector 110. Additionally, the memory section 215 can contain a set timing and pulses for instructing the acoustic detector 110 to indicate its current sensitivity level.

The remote control device 100 also includes a speaker 220 and a power supply 225. The speaker is used to transmit the encoded acoustic control signal to the acoustic detector 110. The power supply can be a battery.

The acoustic detector 110 includes an acoustic sensor 300, acoustic signal decoder 305 and a control section 310. The acoustic sensor 300 can be a microphone. The acoustic sensor 300 senses the encoded acoustic signal from the remote control device 100.

Figure 3:
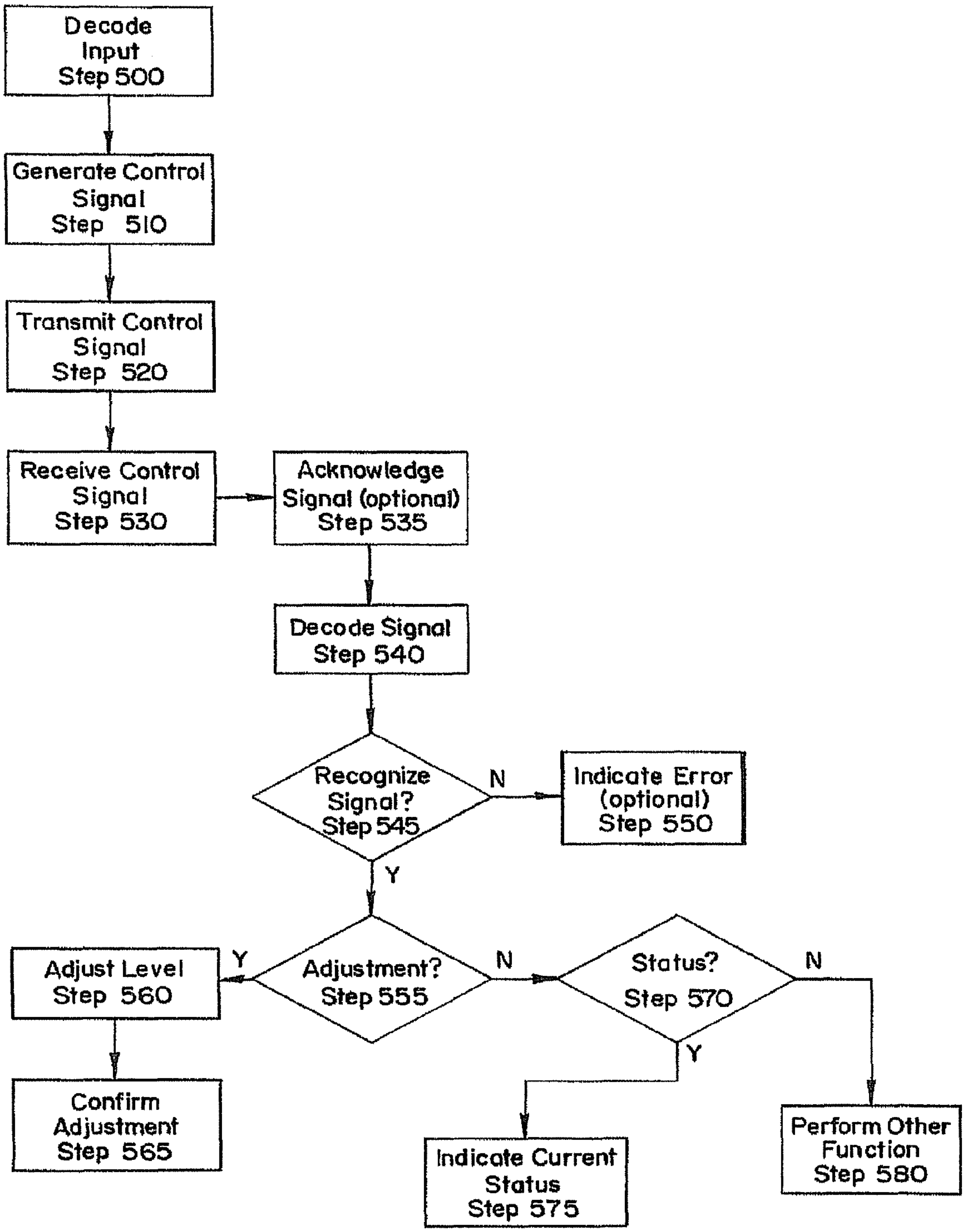
FIG. 3 illustrates a sensitivity adjustment method according to an embodiment of the invention.

The decoder 305 decodes the encoded acoustic signal. The control section 310 can be a microprocessor. FIG. 3 illustrates that the decoder is separate from the control section; however, the two can be integrated.

The acoustic detector 110 also includes a notification section 315. The notification section 315 can be an LED or a speaker. The notification section 315 is used to indicate the current sensitivity level for the sensor 300. Additionally, the notification section 315 can be used as a confirmation of the receipt of the acoustic signal or of a setting of the new sensitivity level.

The acoustic detector 110 includes an internal power source such as a battery. In another embodiment, the acoustic detector 110 can be powered via a wired power source from a security panel.

In an embodiment the encoded acoustic signal is decoded in the manner as described in U.S. Pat. No. 5,524,099 to Rickman.

Figure 2:
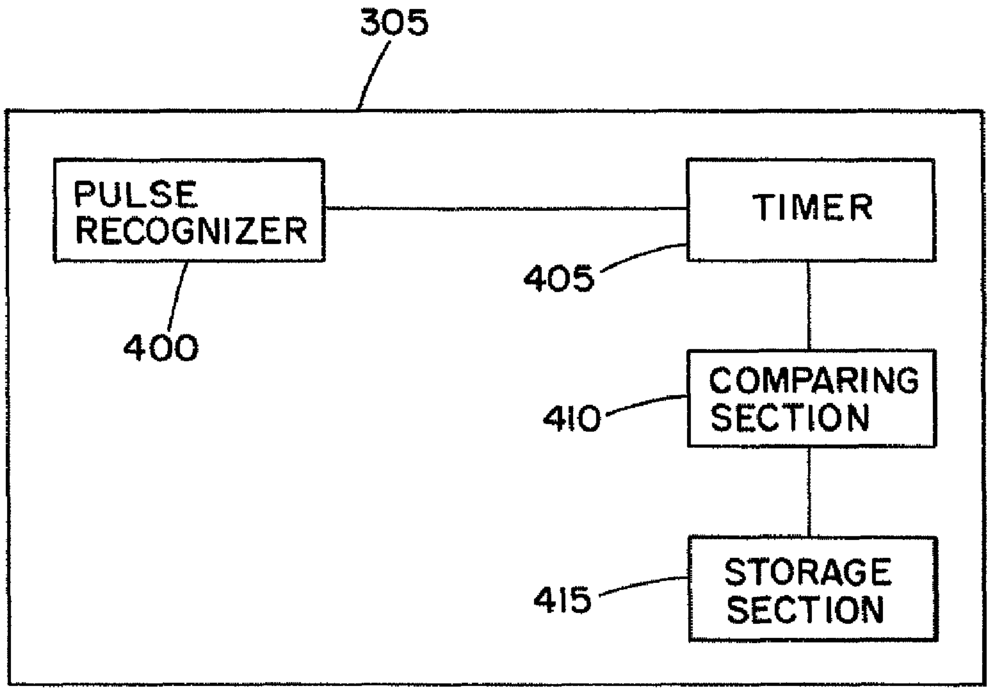
FIG. 2 illustrates a block diagram of the decoder according to an embodiment of the invention.

FIG. 2 illustrates an exemplary decoder 305 according to the invention. The decoder 305 comprises a pulse recognizer 400 coupled to a timer 405. The pulse recognizer 400 generates an output signal for each recognized acoustic pulse. The timer 405 receives the output signal and measures the time between received output signals.

The decoder 305 further includes a comparing section 410 that compares the measured times, that are measured by the timer 405 to predefined time values. The predefined time values are stored in a storage section 415 in advance. The storage section can be memory. Based upon the result of the comparison, the decoder 305 outputs a preset signal to the control section 310. The preset signal is also stored in the storage section 415. Software in the decoder executes the decoding process on the encoded acoustic signal Upon receipt of this preset signal, the control section 310 executes the desired control instruction, e.g., change a threshold value used for detection of an acoustic sound.

FIG. 3 illustrates a flow chart of the remote control method according to an embodiment of the invention. The installer or user inputs an instruction into the remote control device 100 via the user interface 200. Upon receipt of the input, the interface detector 205, decodes the input, at step 500. The decoding method is based upon the type of user interface 200. At step 510, the signal generating section 210 generates the encoded acoustic signal based upon the decoded input. The interface detector 205 forwards the decoded input signal to the signal generating section 210. The signal generating section 210 retrieves from memory 205 the corresponding instruction signal. The memory contains digitized waveforms for sound generation of the acoustic signal, i.e., pulses. The signal generating section selects the acoustic pattern and outputs the signal to the speaker 225. The encoded acoustic signal is transmitted to the acoustic detector 110, at step 520.

The signal contains the pulses and spaces. A timer determines the timing of the pulses and spaces.

At step 530, the acoustic detector 110 receives the encoded acoustic signal. The sensor 300 or microphone detects the sound. Optionally, at step 535, the acoustic detector 110 can acknowledge the encoded acoustic signal. The notification device 315 acknowledges the encoded acoustic signal. The acknowledgement can be in the form of a visual indication, e.g., flashing lights. Alternatively, an audible acknowledgement can be used.

At step 540, the acoustic detector 110 decodes the encoded acoustic signal. The pulse recognizer 400 recognizes a pulse if the acoustic signal exceeds a detection threshold. The detection threshold is used to determine whether an acoustic event has occurred. If the amplitude of a pulse is greater than the detection threshold, it is an event that will be evaluated by the control section 310. The sensitivity of the acoustic detector, as used therein refers to a detection threshold. A low threshold value corresponds to a high sensitivity of the sensor. When the amplitude of the acoustic signal exceeds the threshold, the pulse recognizer 400 outputs a signal. A timer 405 tracks the output of the pulse recognizer 400 and determines the timing of the pulses and spaces. The timing pattern is compared with timings from the storage section 415.

At step 545, the decoder 305 determines whether the timing pattern matched any prestored pattern. In one embodiment, if no match is found, the notification device 315 indicates an error, at step 550. In another embodiment, if no match is found, the acoustic detector 110 will assume that the signal is noise and no action will be taken. The user will resend the control signal. Additionally, the acoustic detector determines whether the acoustic signal is an acoustic event, i.e., glass breakage. If the amplitude of the signal and pattern indicated an event indicative of an intrusion attempt, the acoustic detector 110 will generate an alarm (not shown).

If a match to a prestored instruction is found, the decoder 305 determines whether the signal is an instruction for a sensitivity adjustment, at step 555. At least two signal patterns indicate a sensitivity adjustment. If the signal is an instruction to adjust the sensitivity, the decoder 305 outputs an adjustment signal to the control section 310. At step 560, the control section 310 changes the detection threshold according to the adjustment signal. For example, if the instruction is to increase the sensitivity, the control section 310 changes the detection threshold to a lower value. On the other hand, if the instruction is to decrease the sensitivity, the control section 310 changes the detection threshold to a high value. Each increase or decrease instruction causes the control section 310 to change the detection threshold by one level. In the preferred embodiment, the acoustic detector has four sensitivity levels, i.e., four detection thresholds. The detection thresholds are stored in memory in the control section 310. Once the detection threshold value is set, the control section 305 can confirm the adjustment, at step 565. For example, the notification device 315 can indicate the new sensitivity level, e.g., flashing a light in a specific manner.

If the acoustic signal, at step 555, is not a signal for adjusting the sensitivity, the decoder 305 determines if the signal is an instruction for the acoustic detector 110 to indicate the current sensitivity level, at step 570.

If the acoustic signal is an instruction for the acoustic detector 110 to indicate the current sensitivity level, the decoder 305 outputs a status instruction to the control section 310. The notification device 315 will then indicate the current sensitivity level, e.g., flashing a light in a specific manner, at step 575.

If the acoustic signal is neither an instruction for adjusting the sensitivity nor an instruction for indicating a current sensitivity level, the decoder outputs a signal corresponding to the intended control function and the control section performs the intended control function at step 580. For example, the function can be a mode selection.

The control method according to the invention eliminates the need for any sensitivity switches in the acoustic detector 110.

Figure 4:
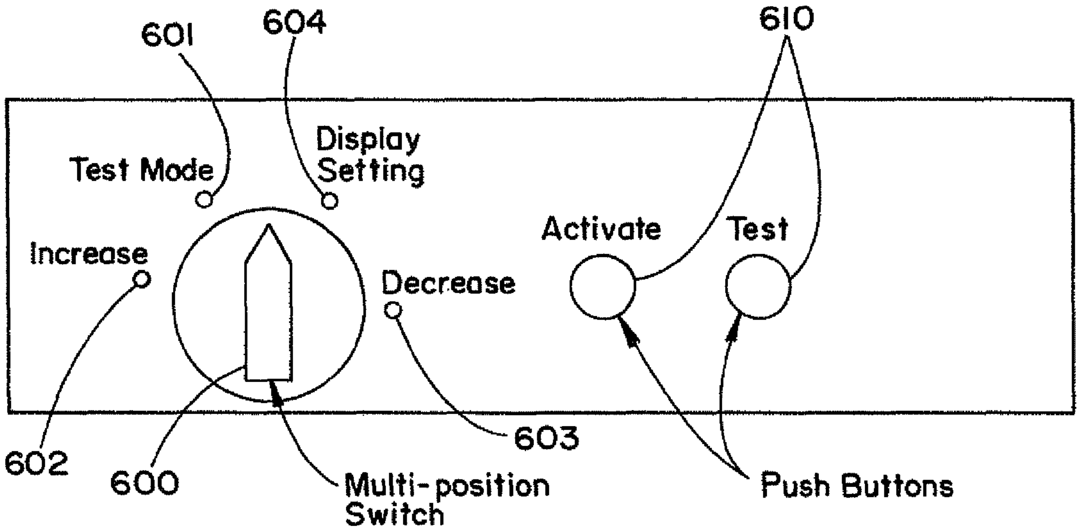
FIG. 4 is an exemplary user interface for the remote control device.

FIG. 4 illustrates one exemplary user interface 200 for the remote device 100. The user interface 200 includes a multi-position switch 600 and several push buttons 610. The multi-position switch 600 includes four settings: test mode 601, increase 602, decrease 603 and display setting 604.

Figure 5:
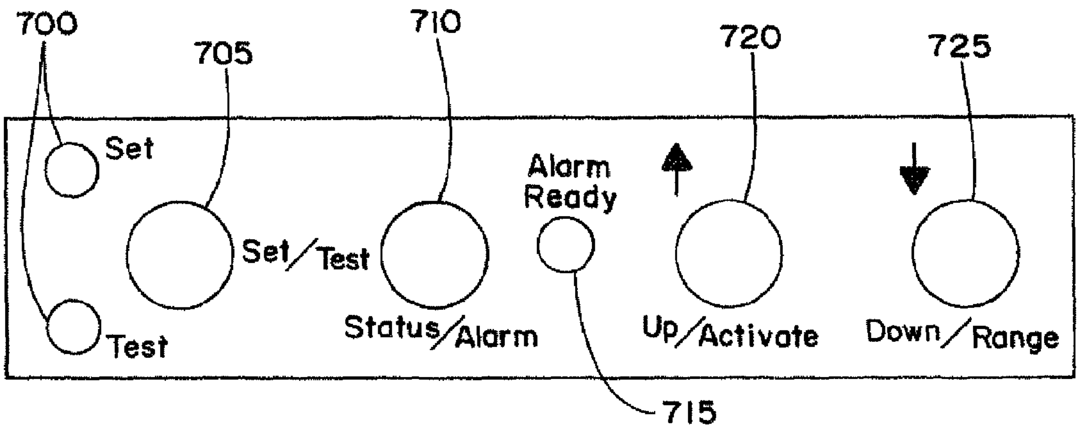
FIG. 5 is another exemplary user interface for the remote control device.

FIG. 5 illustrates another exemplary user interface 200. The user interface 200 includes a plurality of push buttons and LED indicators. The user interface 200 can include a push button for setting a mode of the device 705. The mode is indicated by led indictors 700: one for a test mode and another for a set mode. The user interface 200 can also include a push button for a testing the acoustic detector 110 which arms the remote control device 100 for a full acoustic test 715 in one mode and in a second mode triggers the remote control device 100 to send a status instruction to the acoustic detector 110. The user interface will have a corresponding LED indicator 715 for the test. Additionally, the user interface 200 can include buttons 720 and 725 for adjusting the sensitivity of the acoustic detector in one mode and controlling test features in a second. Button 720, in test mode, will cause the remote control device 100 to send a signal to the acoustic detector 110 to toggle in and out of test mode. Button 720, in set mode, will cause the remote control device 100 to send an acoustic signal to the acoustic detector 110 which is an instruction to increase the sensitivity. Button 725, in test mode, will cause the remote control device 100 to send an acoustic test signal to the acoustic detector 110 which simulates a glassbreak. Button 725, in set mode, will cause the device to send an acoustic signal to the acoustic detector 110 which is an instruction to decrease the sensitivity. This exemplary user interface might be used when the remote control device 100 is a glassbreak simulator.

As described above, the acoustic detector 110 increases or decreases the sensitivity level (threshold) one level for each control instruction, i.e., one encoded acoustic signal; however, in another embodiment, the remote control device can transmit a single encoded acoustic signal that causes the acoustic detector 110 to set a maximum sensitivity or a minimum sensitivity level.

In another embodiment of the invention, instead of changing the detection threshold to increase or decrease sensitivity of the sensor 300, the control section 310 can modify the gain of an amplifier that is used to amplify the signal from the sensor 300. A sensor 300 drives a bandpass amplifier. The bandpass filter has a predefined center frequency and preset gain at the center frequency. The preset gain can be adjusted to increase or decrease the sensitivity of the sensor, without changing the detection threshold.

While the encoded signal has been described as an encoded acoustic signal in the preferred embodiment, in another embodiment the encoded signal can be any wireless signal such as a RF signal or an infrared signal.

If the encoded signal is an infrared signal, the remote control device 100 will include an infrared transmitter and the acoustic detector 110 will include an infrared detector. The infrared detector can be an infrared diode. The infrared transmitter and infrared detector will be configured such that the emitting frequency of the transmitter and the detection frequency of the detector match, i.e., have the same center frequency.

The infrared signal has the same pattern of pulses and spaces therebetween and, therefore, a similar decoder can be used.

If the encoded signal is an RF signal, the remote control device 100 will include an RF transmitter and the acoustic detector will include an RF detector. The RF signal includes a predefined signal pattern of pulses and spaces therebetween, as described above. The same decoder can be used to decode the RF signal.

An installer can use the remote sensitivity adjustment method during installation. In another embodiment, an owner of the acoustic detector can adjust the sensitivity of the detector after installation, if the acoustic properties of the room change.

When the installer performs the described remote adjustment method, the adjustment process is only part of the configuration and calibration process. In the case of an acoustic glassbreak detector, the calibration process will also include a simulation of the sound of glass breaking. The results of the simulation affects whether the installer changes the sensitivity. For example, the installer will activate a test mode by depressing buttons on the simulator (e.g., 610). The acoustic detector 110 receives the activation signal and decodes the signal as described above. The control section 310 causes the acoustic detector 110 to enter test mode and the notification device 315 will confirm the mode. The installer then moves to the furthest point on a glass that is being protected and will generate an acoustic sound that simulates the sound of glass breaking. The speaker 225 of the simulator (e.g., remote control device 100) is pointed toward the acoustic detector 110. If the acoustic detector 110 does not detect the acoustic sound, e.g., amplitude of the received sound is not greater than the detection threshold; the installer can increase the sensitivity, e.g., lower threshold, as described above, i.e., initiate an increase sensitivity signal. An encoded signal will be transmitted from the remote control device 100, e.g., simulator. The detector will change the sensitivity, e.g., detection threshold and the installer will repeat the process, i.e., resend the same acoustic sound. The sensitivity of the acoustic detector will be changed until the acoustic sound is detected or until a maximum sensitivity is reached.

Alternatively, if the acoustic detector 110 detects the acoustic sound, i.e., amplitude of the received sound is greater than the detection threshold; the installer can decide to decrease the sensitivity, e.g., increase the detection threshold, as described above, i.e., initiate a decrease sensitivity signal. Optimally, the sensitivity level should be the lowest level in which the acoustic detector can detect the test signal. An encoded signal will be transmitted from the remote control device 100, e.g., simulator. The detector will change the sensitivity, e.g., detection threshold and the installer will repeat the process, i.e., resend the same acoustic sound.

In another embodiment, the remote control device 100 can be a keypad associated with a security system. The keypad can broadcast an acoustic signal. This provides an advantage of enabling a user to adjust the sensitivity of the acoustic detector 110 using his or her security keypad. For example, if a thick carpet is added or new furniture is added to the room, the acoustic properties of the room will change. The additions will change signal reflection and absorption that might interfere with the detection of an acoustic sound. The acoustic signal can be pre-installed into a keypad or uploaded from a remote monitoring center. Alternatively, the remote control device 100 can be a wireless handheld keyfob.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method of operating an acoustic detector comprising:

a. receiving an acoustic signal;

b. decoding a nature of the acoustic signal;

c. recognizing the nature of the decoded acoustic signal as being an acoustic event that simulates breaking glass and generating an alarm; and d. at least one of recognizing the nature of the decoded acoustic signal as being an instruction for sensitivity adjustment and adjusting the sensitivity of the acoustic detector according to the instruction and recognizing the nature of the decoded acoustic signal as being an instruction for the acoustic detector to indicate a current sensitivity level of the acoustic detector and indicating the current sensitivity level of the acoustic detector.

2. The method of claim 1, wherein the adjusting step comprises varying a detection threshold, said detection threshold is used for alerting a controller of an acoustic event.

3. The method of claim 1, further comprising the step of confirming the adjustment of the sensitivity.

4. The method of claim 3, wherein said confirmation includes indicating a new sensitivity level.

5. The method of claim 4, wherein said indication is a visual indication.

6. The method of claim 1, wherein said decoding step comprises the steps of:

a. detecting a leading edge of a plurality of pulses of said signal;

b. outputting a detection signal indicating the detection of the pulses;

c. determining timings between the detection of each pulse;

d. comparing the timings of the detection with a predefined timing; and outputting the instruction based upon said comparison.

7. The method of claim 1, further comprising the steps of:

a. programming one or more predefined signals; and b. assigning the one or more predefined signals to an operating instruction.

8. A system for controlling a sensitivity of an acoustic detector comprising:

a remote control device for generating and transmitting a plurality of separate acoustic signals to the acoustic detector, said plurality of acoustic signals including a first signal of the plurality of signals embodying an operating instruction for the acoustic detector and a second signal of the plurality of signals embodying a simulation of glass breakage, said first signal embodied as an operating instruction comprising a plurality of pulses separated by predefined spaces; and an acoustic detector, having a receiving section for receiving the plurality of signals, a decoder for decoding the first signal into an operating instruction, and a controller for adjusting the sensitivity of a sensor according to the operating instruction, said controller generates an alarm in the case where the decoder determines the signal is glass breakage.

9. The system according to claim 8, wherein said remote control device is an acoustic simulator.

10. The system according to claim 8, wherein said remote control device is a wireless security system keypad.

* * * * *